United States Patent [19]
Abolins et al.

[11] 4,020,124
[45] Apr. 26, 1977

[54] BLENDS OF A POLYPHENYLENE ETHER RESIN, ALKENYL AROMATIC RESINS MODIFIED WITH EPDM RUBBER AND GRAFT POLYMERIZED HIGH RUBBER CONTENT POLYMERS

[75] Inventors: Visvaldis Abolins; Glenn D. Cooper, both of, Delmar; Gim F. Lee, Jr., Albany, all of N.Y.

[73] Assignee: General Electric Company, Pittsfield, Mass.

[22] Filed: Dec. 22, 1975

[21] Appl. No.: 642,982

Related U.S. Application Data

[62] Division of Ser. No. 443,150, Feb. 15, 1974, Pat. No. 3,981,841.

[52] U.S. Cl. .................... 260/876 R; 260/42.18; 260/42.22; 260/45.7 R; 260/45.7 P; 260/45.75 B; 260/45.9 R; 260/45.9 NP; 260/45.95 D; 260/874; 260/897 R; 260/901
[51] Int. Cl.² ................. C08L 51/04; C08L 31/04
[58] Field of Search ............... 260/876 R, 901, 874, 260/897 R

[56] References Cited

UNITED STATES PATENTS

| 3,383,435 | 5/1968 | Cizek | 260/874 |
| 3,538,192 | 11/1970 | Bishop | 260/878 R |
| 3,657,395 | 4/1972 | Meredith et al. | 260/878 R |
| 3,787,532 | 1/1974 | Carmelite et al. | 260/876 R |
| 3,974,235 | 8/1976 | Cooper et al. | 260/876 R |

*Primary Examiner*—Murray Tillman
*Assistant Examiner*—Thurman K. Page
*Attorney, Agent, or Firm*—William F. Mufatti; Edward A. Hedman; James V. Costigan

[57] ABSTRACT

Novel thermoplastic compositions are disclosed which include a polyphenylene ether resin, an alkenyl aromatic resin modified with an EPDM rubber and an emulsion graft copolymer of an alkenyl aromatic resin and a rubbery interpolymer of a mixture of monoolefins and a polyene; or a graft polymerization product of an acrylic monomer alone or in admixture with styrene and a rubber diene polymer or styrenediene copolymer. Also included with the scope of this invention are reinforced and flame-retardant compositions of said thermoplastic materials.

4 Claims, No Drawings

BLENDS OF A POLYPHENYLENE ETHER RESIN, ALKENYL AROMATIC RESINS MODIFIED WITH EPDM RUBBER AND GRAFT POLYMERIZED HIGH RUBBER CONTENT POLYMERS

This is a division of application Ser. No. 443,150 filed Feb. 15, 1974, now U.S. Pat. No. 3,981,841.

This invention relates to compositions of a polyphenylene ether resin, an alkenyl aromatic resin that is modified with an EPDM rubber and an emulsion graft copolymer of an alkenyl aromatic resin and a rubbery interpolymer of a mixture of monoolefins and a polyene; or an emulsion graft polymerization product of an acrylic monomer alone or in admixture with a styrene monomer and a rubbery diene homopolymer or styrene-diene copolymer. Reinforced and flame-retardant compositions are also provided.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents the polyphenylene ethers are prepared by an oxidative coupling reaction comprising passing an oxygen-containing gas through a reaction solution of a phenol and a metal-amine complex catalyst. Other disclosures relating to processes using metal-amine catalyst are found in Bussink et al, U.S. Pat. No. 3,337,499; Blanchard et al, U.S. Pat. No. 3,219,626; Laakso et al, U.S. Pat. No.. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyhenylene ethers are produced by reacting the corresponding phenolate ion with an initiator, such as peroxy acid salt, and acid peroxide, a hypohalite, and the like, in the presence of a complexing agent. Disclosures relating to non-catalytic processes, such as oxidation with lead dioxide, silver oxide, etc. are described in Price et al, U.S. Pat. No. 3,382,212. All of the above-mentioned disclosures are incorporated herein by reference.

The term "alkenyl aromatic resin" includes polymers and copolymers of styrene, alpha methyl styrene, chlorostyrene, ethylvinylbenzene, divinylbenzene, vinylnaphthalene and the like.

The term "EPDM" includes rubbery interpolymers of a mixture of monoolefins and a polyene. Preferred type are those rubbery interpolymers of ethylene, an alpha olefin and a polyene.

In the prior art rubber-modified styrene resins have been admixed with polyphenylene ether resins to form compositions that have modified properties. The Cizck patent, U.S. Pat. No. 3,383,435 discloses rubber-modified styrene resin-polyphenylene ether resin compositions wherein the rubber component is of the unsaturated type such as polymers of butadiene, or copolymers of butadiene and styrene. The physical properties of these compositions are such that it appears that many of the properties of the styrene resins have been upgraded, while the moldability of the polyphenylene ethers is improve.

Ger. Offen. Pat. No, 2,047,613 discloses that from 0.5–15% by weight of an EPDM modified styrene resin may be used to upgrade the impact strength of polyphenylene ether resin. There is no suggestion to use higher amounts or that higher amounts will improve the oxidative stability and color stability of a polyphenylene ether composition. Also no additional resinous materials are mentioned as components of the diclosed composition.

It has now been found that a composition of a polyphenylene ether resin; an alkenyl aromatic resin that is modified with a rubbery interpolymer of a mixture of monoolefins and a polyene; and an emulsion graft copolymer of an alkenyl aromatic resin and a rubbery interpolymer of a mixture of monoolefins and a polyene or a graft polymerization product of an acrylic monomer alone or in admixture with a styrene monomer and a rubbery didne homopolymer or copolymer of styrene and a diene is a very useful thermoplastic molding material which has good thermal oxidative stability and good impact strength.

It is, therefore, a primary object of this invention to provide improved compositions that are based on polyphenylene ether resins and modified alkenyl aromatic resins.

Another object of this invention is to provide molding compositions and molded articles that are based on a polyphenylene ether resin and a modified alkenyl aromatic resin which have improved thermal oxidative stability.

Still another object of this invention is to provide molding composition and molded articles that are based on a polyphenylene ether resin and a modified alkenyl aromatic resin which have, in addition, an emulsion grafted alkenyl aromatic resin and a rubbery interpolymer; or an emulsion grafted acrylic or acrylic and styrene polymer on a rubbery diene homopolymer or styrene-butadiene rubber backbone.

It is also an object of this invention to provide the above-described, improved molding compositions in reinforced and/or flame retardant embodiments.

DESCRIPTION OF THE INVENTION

The above-mentioned advantages and objects and others will be readily apparent to those skilled in the art by the following compositions.

Preferred types will include thermoplastic compositions which comprise:

a. from 20–65% by weight of a polyphenylene ether resin;

b. from 25–70% by weight of an alkenyl aromatic resin that is modified with an EPDM rubber, that is, a rubbery interpolymer of a mixture of monoolefins and a polyene; and c. from 5–20% by weight of an emulsion graft copolymer of an alkenyl aromatic resin and a rubbery interpolymer of a mixture of monoolefins and a polyene; or an emulsion graft polymerization product of an acrylic monomer alone or in admixture with a styrene monomer and a rubbery diene homopolymer or styrene-diene copolymer.

The preferred EPDM rubbery interpolymers that may be used to modify the alkenyl aromatic resins include those prepared from ethylene, an alpha olefin and a polyene. Preferred types comprise 10–90 mole percent of ethylene, 10–90 mole percent of an alpha olefin containing 3–16 carbon atoms and 0.1–10 mole percent of a polyene that is a non-conjugated cyclic or openchain diene that has from 4–20 carbon atoms. Especially preferred are those alpha olefins having 3–10 carbon atoms and nonconjugated cyclic or openchain diene having from 5–10 carbon atoms.

The alkenyl aromatic resins are well known and are derived from monomers of the formula:

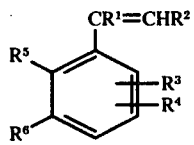

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom.

Specific examples of alkenyl aromatic monomers include styrene, chlorostyrene, alpha-methylstyrene, vinyl xylene, divinylbenzene and vinyl naphthalene. The preferred polyphenylene ethers are of the formula:

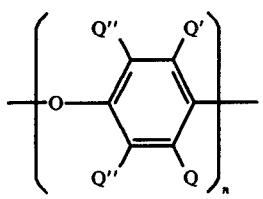

wherein Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, Q' and Q'' are the same as Q, and in addition, halogen with the proviso that Q, Q' and Q'' are all free of a tertiary carbon atom; and n is an integer of at least 50.

Especially preferred is poly-(2,6-dimethyl-1,4-phenylene) ether.

The alkenyl aromatic resin that is modified with a rubbery interpolymer of a mixture of monoolefins and a polyene may be prepared by dissolving the rubbery interpolymer in the alkenyl aromatic monomer and polymerizing the mixture in the presence of a free-radical initiator until 90–100% by weight of the alkenyl aromatic monomer has reacted to form said modified alkenyl aromatic resin. These materials are commercially available, such as the product Taflite 925-01 which is a suspension polymerized EPDM modified, high-impact polystyrene that contains about 12% of benzene insoluble rubber and the average rubber particle size is about 8–10 microns. The EPDM component appears to be an ethylene-propylene-ethylidene norbornene terpolymer. They are also decribed in U.S. Pat. No. 3,538,192, which is hereby incorporated by reference. Also, the EPDM rubbers are described in: Vinyl and Allied Polymers, P. D. Ritchie, Volume 1, Page 121 (1968) and the EPDM modified resins are described in: J. Appl. Polymer Sci., Volume 16, Pages 11251138 (1972) which are also incorporated by reference. The preferred modified alkenyl aromatic resins are those made with an EPDM rubbery interpolymer of ethylene, propylene and 5ethylisdene-2-norbornene and styrene. Preferred modified alkenyl aromatic resins will include from about 5 to about 20% by weight of rubbery interpolymer.

The emulsion graft copolymer of an alkenyl aromatic resin and a rubbery interpolymer of a mixture of monoolefins and a polyene is preferably based on a rubbery interpolymer that comprises 10-90 mole percent of ethylene, 10–90 mole percent of an alpha olefin having from 3–10 carbon atoms and from 0.1-10 mole percent of a polyene that is a non-conjugated cyclic or openchain diene that has from 5–10 carbon atoms. An especially preferred type of rubbery interpolymer is derived from ethylene, propylene and 5-ethylidene-2-norbornene. The preferred alkenyl aromatic resin is styrene resin. The emulsion graft copolymers may have from 30–60 part by weight of rubbery interpolymer and from 40–70 parts by weight of alkenyl aromatic resin. These materials are commercially available and a preferred product is JSR-5 which is manufactured by the Japan Synthetic Rubber Co. This product has about 50% EPDM and 50% styrene and has a small rubber particle size (0.1–0.5 microns).

These products may be prepared by making a latex from an EPDM rubber using the following recipe:

| Ingredients | Parts by weight |
|---|---|
| ethylene-propylene-5-ethylidene-2-norbornene* (6% solution in commercial n-hexane) | 100 |
| soap solution (Dresinate 214-potassium) salt of disproportionated resin acid 2 parts; potassium hydroxide 0.5 parts; and water 100 Parts) | 102.5 |

*as noted in Example I of U.S. 3,657,395, which patent is hereby incorporated by reference.

The soap solution and the rubber solution is emulsified in a homogenizer and thereafter the hexane is stripped off with steam. The latex is creamed to remove excess soap by adding 0.5 parts of a 1% aqueous solution of ammonium alginate. The finished latex is adjusted to 20% solids.

This latex is then graft copolymerized with styrene as follows:

250 parts by weight of the latex are charged into a glass bottle. 1.0 parts by weight of t-butyl peroxypivalate and 0.25 parts by weight of divinylbenzene are added. The bottle is purged with nitrogen, sealed and placed in a 70° C bath for 5 hours. After 5 hours, the bottle is opened and 50 parts by weight of styrene is added and the bottle is repurged and resealed. After about 4 hours the monomer is substantially converted to graft copolymer.

This procedure is described in U.S. Pat. No. 3,435,096 which is hereby incorporated by reference.

The graft polymerization product of an acrylic monomer and a diene rubber preferably comprises (1) from about 20–80% by weight of a backbone polymer of the units of butadiene or butadiene and styrene, wherein the butadiene units are present in quantities of at least 40% by weight of the backbone polymer, (2) 80–20% by weight of an acrylic monomer graft polymerized to (1); said acrylic monomer units being selected from the group consisting of lower alkyl methacrylates, alicyclic methacrylates and alkyl acrylates, and (3) 0 to 60% by weight of a styrene monomer graft polymerized to (1) sequentially before the polymerization of (2).

The graft polymerization product of an acrylic monomer alone or with styrene monomer and the rubbery diene polymer or copolymer may be prepared by known techniques, typically by emulsion polymerization. They may be formed from a styrene-butadiene copolymer latex and a monomeric material such as methyl methacrylate alone or with another compound having a single vinylidene group copolymerizable therewith, e.g., styrene. For example, in the preparation of a representative material, 85–65 parts by weight of monomeic methyl methacrylate or monomeric methyl methacrylate to the extent of at least 55% and preferably as much as 75% by weight in admixture with another monomer which copolymerizes therewith, such as ethyl acrylate, acrylonitrile, vinylidene chloride, styrene, and similar unsaturated compounds containing a single vinylidene group, is added to 15–35 parts by weight of solids in a styrenebutadiene copolymer latex. The copolymer solids in the latex comprise about 10–50% by weight of styrene and about 90–50% by weight of butadiene and the molecular weight thereof is within the range of about 25,000 to 1,500,000. The copolymer latex of solids in water contains a dispersing agent such as sodium oleate or the like to maintain the copolymer in emulsion. Interpolymerization of the monomer or monomeric mixture with the copolymer solids emulsified in water is brought about in the presence of a free-radical generating. catalyst and a polymerization regulator which serves as a chain transfer agent, at a temperature of the order of 15° to 80° C. Coagulation of the interpolymerized product is then effected with a calcium chloride solution, for instance, whereupon it is filtered, washed and dried. Other graft copolymers and differing from the above only in the ratio of monomeric material solely or preponderantly of methyl methacrylate to the butadienestyrene copolymer latex in the presence of which it is polymerized extends from 85–25 parts by weight of the former to 15–75 parts by weight of the latter. These materials may extend in physical properties from relatively rigid compositions to rubbery compositions. A preferred commercially available material is Acryloid KM 611 which is sold by Rohm & Haas. Also, U.S. Pat. Nos. 2,943,074 and 2,857,360, which are incorporated by reference, contain additional information as to the preparation of three materials. A preferred material is described in U.S. 2,943,074, Column 4, preparation D and converted to emulsified polymer B as described therein.

As reinforcing fillers, there may be employed reinforcing amounts of reinforcing filler. In general, any reinforcement can be used, e.g., aluminum, iron or nickel, and the like, and non-metals, e.g., carbon filaments, silicates, such as acicular calcium silicate, asbestos, $TiO_2$, potassium titanate and titanate whiskers, glass flakes and fibers and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as E glass. However, other glasses are useful where electrical properties are not so important, e.g., the low soda glass known as C glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convienent to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛ inch).

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame retardant.

It is a preferred feature of this invention also to provide flame retardant thermoplastic compositions, as defined above by modifying the composition to include a flame-retardant additive in a minor porportion but in an amount at least sufficient to render the composition non-burning or self-extinguishing.

A preferred feature of the invention is a flame-retardant composition as above defined, which also includes a halogenated organic compound, a halogenated organic compound in admixture with an antimony compound, elemental phosphorous or a phosphorus compound or compounds containing phosphorusnitrogen bonds or a mixture of two or more of the foregoing.

When used herein, the terms "non-burning", "self-extinguishing" and "non-dripping" are used to described compositions which meet the standards of ASTM test method D-635 and Underwriters' Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test Method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, anitmony, phosphorus and nitrogen. It is preferred that the flame-retardant additive comprise a halogenated organic compound (brominated or chlorinted); a halogen-containing organic compound in admixture with antimony oxide; elemental phosphorus or a phorsphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition-major proportions will detract from physical properties - but at least sufficient to render the polyphenylene ether-modified alkenyl aromatic polymer blend non-burning or self-extinguishing. Those skilled in the art are well aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsible for flame-retardance will be sufficient, e.g., elemental red phosphorus will be preferred at 0.5 to 10 parts by weight per hundred parts of (a) plus (b), while phosphorus in the form of triphenyl phosphate will be used at 5 to 25 parts of phosphate per part of (a) plus (b), and so forth. Halogenated aromatics will be used at 2 to 20 parts and synergists, e.g., antimony oxide, will be used at about 1 to 10 parts by weight per 100 parts of components (a) plus (b).

Among the useful halogen-containing compounds are those of the formula

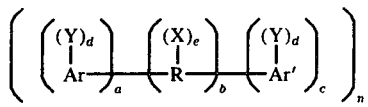

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfurcontaining linkage, e.g., sulfide, sulfoxide, sulfone, carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art. Compounds of this type are disclosed in U.S. Pat. Nos. 3,647,747 and 3,334,154 both of which are incorporated by reference.

Ar and Ar' are mono- or polycarbocyclic aromatic groups such as phenylene, biphenylene, terphenylene, naphthylene, and the like. Ar and Ar' may be the same or different.

Y is a substitutent selected from the group consisting of organic, inorganic or organometallic radicals. The substituents represented by Y include (1) halogen, e.g., chlorine, bromine, iodine, or fluorine or (2) ether groups of the general formula OR, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon groups exemplified by the following: alkyl, such as methyl, ethyl, propyl, isopropyl, butyl, decyl, and the like; aryl groups, such as phenyl, naphtyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0. When $b$ is not 0, neither $a$ nor $c$ may be 0. Otherwise, either $a$ or $c$, but not both, may be 0. Where $b$ is 0, the aromatic groups are joined by a direct carbon-carbon bond.

The hydroxyl and Y substituents on the aromatic groups, Ar and Ar' can ve varied in the ortho, meta or para positions on the aromatic rings and the groups can be in any possible geometric relationship with respect to one another.

Included within the scope of the above formula are di-aromatics of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichloromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyL)propane The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Especially preferred are hexabromobenzene and chlorinated biphenyls or terphenyls, along, or mixed with antimony oxide.

In general, the preferred phosphate compounds are selected from elemental phosphorus or organic phosphonic acids, phosphonates, phosphinates, phosphonites, phosphinites, phosphine oxides, phosphines, phosphites or phosphates. Illustrative is triphenyl phosphine oxide. These can be used alone or mixed with hexabrombenzene or a chlorinated biphenyl and, optionally, antimony oxide.

Typical of the preferred phosphorus compounds to be employed in this invention would be those having the general formula

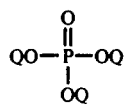

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbiadodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylkexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardent additives for this invention are compounds containing phosphorus-nitrogen bonds, such as phosphonitrilic chloride, phosphorus ester amides, phosphoric acid amides, phosphonic acid amides, phosphinic acid amides, tris)aziridinyl)-phosphine oxide or tetrakis (hydroxymethyl) phosphonium chloride. These flame-retardent additives are commercially available.

The blends may be formed by conventional techniques, that is by first dry mixing the components and, thereafter, melt blending the composition in an extruder.

By way of illustration, glass roving (a bundle of strands of filaments) is chopped into small pieces, e.g., ⅛ inch to 1 inch in length, and preferably less than ¼ inch in length and put into an extrusion compounder with (a) the polyphenylene ether resin, (b) the alkenyl aromatic resin that is modified with a rubbery interpolymer of a mixture of monoolefins and a polyene, the flame-retardent additive(s) and (e) to produce molding pellets. The fibers are shortened and predispersed in the process, coming out at less than 1/16 inch long. In another procedure, glass filaments are ground or milled to short lengths, and are mixed with the polyphenylene ether resin, the modified alkenyl aromatic polymer and, optionally, flame retardent additive by dry blending then either fluxed on a mill and ground, or they are extruded and chopped.

In addition, compounding should be carried out to insure that the residence time in the machine is short; the temperature is carefully controlled; frictional heat is utilized; and an intimate blend between the resins and the additives is obtained. Various pigments, fillers and processing aids may also be used according to techniques well known to those skilled in the art.

The EPDM terpolymers are well known and may be prepared as disclosed in U.S. Pat. Nos. 2,933,480, 3,093,620, 3,093,621, 3,211,709, 3,113,115 and 3,300,450 which are incorporated by reference.

DESCRIPTION OF THE PREFERRED EMBODIMENTS

The following examples are set forth as further descriptions of the invention, but are not to be construed as limiting the invention thereto.

EXAMPLE I

EXAMPLE I

| poly-(2,6-dimethyl-1,4-phenylene) ether | polystyrene resin modified with rubbery interpolymer of a mixture of monoolefins and a polyene | rubbery interpolymer of a mixture of monoolefins and a polyene | graft polymerization product of an acrylic monomer, styrene and a BD-S copolymer rubber | homo-polystyrene | Izod impact strength ft. lbs/in. of notch |
|---|---|---|---|---|---|
| 50* | 50* | — | — | — | 1.9 |
| 50* | 35* | 15* | — | — | 3.5 |
| 50* | 35* | — | 15* | — | 4.8 |
| 50* | 20* | 5* | — | 25* | 1.7 |

*Wt. % of resin, exclusive of other additives.

| | Grams |
|---|---|
| poly-(2,6-dimethyl-1,4-phenylene) ether (PPO, General Electric Company having a instrinsic viscosity of about 0.52 deciliters/gram measured in chloroform at 30° C). | 35 |
| polystyrene modified with a terpolymer of ethylene, propylene and 5-ethylidene-2-norbornene having a Mooney viscosity of 140 (ML-8) (prepared according to Example VIII of U.S. 3,538,192). | 60 |
| emulsion copolymer of 50 parts by weight of styrene and 50 parts by weight of a terpolymer of ethylene, propylene and 5-ethylidene-2-norbornene, said terpolymer having an unsaturation level of 8,7 carbon-to-carbon double bonds per 1000 carbon atoms and a Mooney value of 66 (ML-4). (as used in Example I of U.S. 3,657,395) | 5 |

This blend is prepared with a twin-screw extruder at about 585° F and the extruded pellets were molded into standard test pieces with a Newbury injection molding machine, barrel temperature at about 450° F.

EXAMPLE II

A mixture of 500 g. of poly-(2,6-dimethyl-1,4-phenylene) ether (PPO, General Electric Company, having an intrinsic viscosity of about 0.52 deciliters/gram when measured in chloroform at 30° C); 500 g. of polystyrene resin modifed with a rubbery interpolymer of a mixture of monoolefins and a polyene (Taflite 925-01, Mitsui Toatsu Chemical Co.) 10 g. of tridecylphosphite, 15 g. of polyethylene (Microthene) 1.5 g. of zinc sulfide, 1.5 g. of zinc oxide and 50 g. of titanium oxide were extruded on a W-P twin-screw extruder at 620° F and the extruded pellets were molded into standard test pieces using a Newbury injection molding machine. Other blends were prepared in which a portion of the plystyrene which was modified with a rubbery interpolymer of a mixture of monoolefins and a polyene was replaced with either an emulsion graft copolymer of an alkenyl aromtic resin and a rubbery interpolymer of a mixture of monoolefins and a polyene (JSR-5); a graft polymerization product of an acrylic monomer, styrene and a butadiene-styrene copolymer rubber (Acryloid KM-611) or homopolystyrene (HH101). Test samples having the above-noted composition were tested for impact strength and the results are reported in Table I.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic molding composition which comprises:
   a. from 20–65% by weight of a polyphenylene ether resin;
   b. from 25–70% by weight of an alkenyl aromatic resin that is modified with a rubbery interpolymer which comprises 10–90 mole percent of ethylene, 10–90 mole percent of an alpha olefin having from 3–10 carbon atoms and from 0.1–10 mole percent of a polyene that is a non-conjugated cyclc or open-chain diene that has from 5–10 carbon atoms; and
   c. from 5–20% by weight of a graft copolymer comprising (1) from 20–80% by weight of a back-bone polymer of the units of butadiene or butadiene and styrene, wherein the butadiene units are present in quantities of at least 40% by weight of the backbone polymer, (2) 80–20% by weight of an acrylic monomer graft polymerized to (1) the acrylic monomer units chosen from the group consisting of lower alkyl methacrylates, alicyclic methacrylates and alkyl acrylates, and (3) 0 to 60% by weight of a styrene monomer graft polymerized to (1) sequentially before the polymerization of (2).

2. The molding composition of claim 1 wherein the alkenyl aromatic resin is styrene resin.

3. The molding composition of claim 2 wherein said rubbery interpolymer comprises 10–90mole percent of ethylene; 10-90 mole percent of propylene and 0.1–10 mole percent of 5-ethylidene-2-norbornene.

4. The molding composition of claim 2 wherein the polyphenylene ether resin is poly-(2,6-dimethyl-1,4-phenylene) ether resin.

* * * * *

UNITED STATES PATENT AND TRADEMARK OFFICE
CERTIFICATE OF CORRECTION

PATENT NO. : 4,020,124
DATED : April 26, 1977
INVENTOR(S) : Visvaldis Abolins and Glenn D. Cooper It is certified that error appears in the above-identified patent and that said Letters Patent are hereby corrected as shown below:

Col. 2, line 22, "didne" should be --diene--

Col. 4, line 10, "11251138" should be --1125-1138--
, line 13, "5ethylisdene-" should be -- 5-ethylidene- --

Col. 5, line 23, "monomeic" should be --monomeric--
, line 48-49, "butadienes-tyrene" should be --butadiene-styrene--
, line 58, "three" should be --these--

Col. 6, line 45, "conveinent" should be --convenient--

Col. 7, line 6, "clemental" should be --elemental--
, line 37, "chlorinted" should be --chlorinated--

Col. 8, line 36, "OR" should be --OE--

Col. 9, line 44, "along" should be --alone--

Col. 10, line 2, "phenylbiadodecyl" should be --phenylbisdodecyl
, line 14, "trimethylkexyl" should be --trimethylhexyl-

UNITED STATES PATENT OFFICE
CERTIFICATE OF CORRECTION

Patent No. 4,020,124　　　Dated April 26, 1977

Inventor(s) Visvaldis Abolins et al.

It is certified that error appears in the above-identified patent and that said Letters Patent are hereby corrected as shown below:

Column 11, line 54, "plystyrene" should be -- polystyrene --.

Signed and Sealed this twenty-third Day of August 1977

[SEAL]

Attest:

RUTH C. MASON
*Attesting Officer*

C. MARSHALL DANN
*Commissioner of Patents and Trademarks*